Nov. 16, 1937. J. WILEY 2,099,638

MOLDING MACHINE

Filed Aug. 3, 1936 3 Sheets-Sheet 1

Joe Wiley
INVENTOR

BY Victor J. Evans & Co.
ATTORNEYS

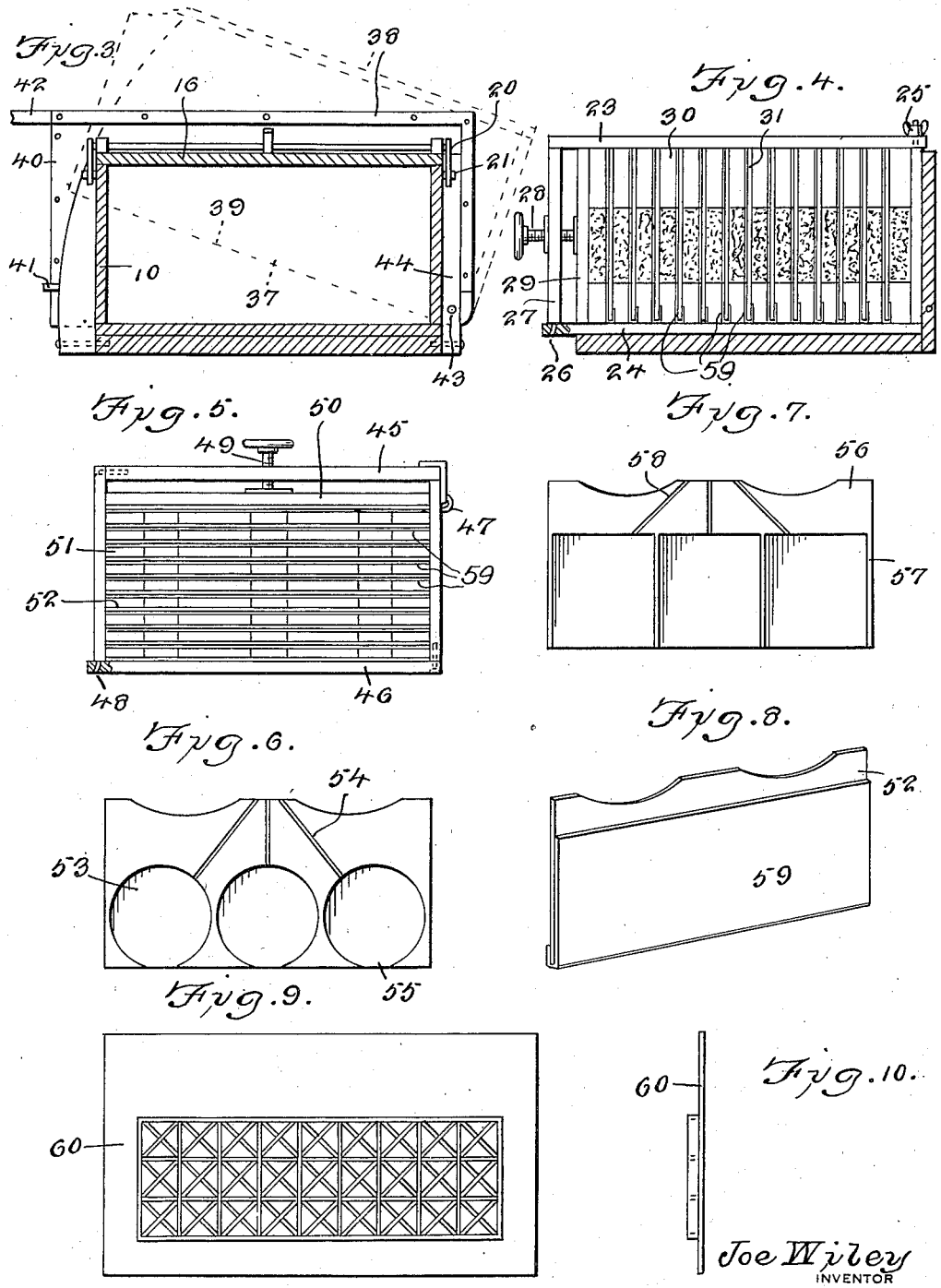

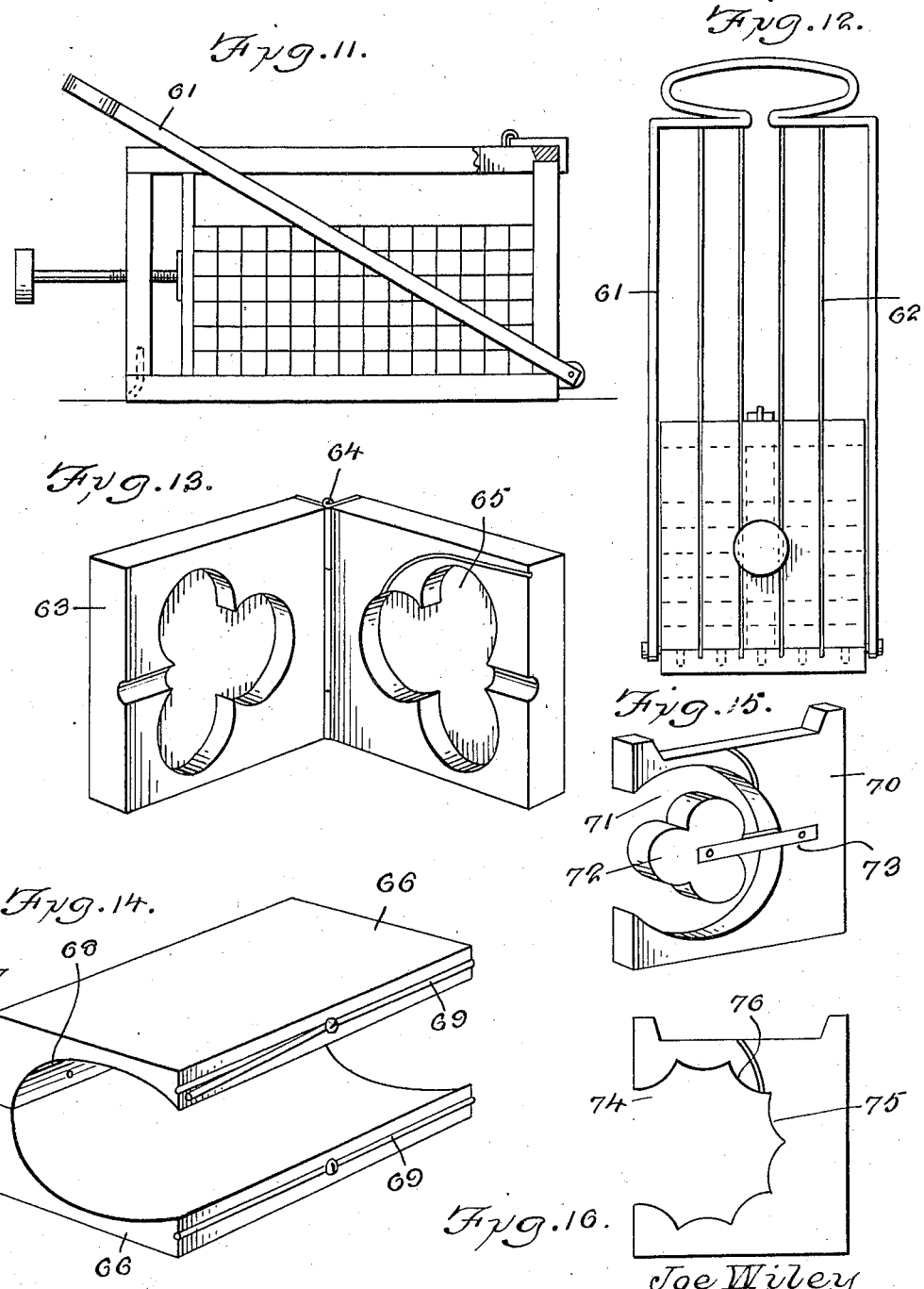

Patented Nov. 16, 1937

2,099,638

UNITED STATES PATENT OFFICE 2,099,638

MOLDING MACHINE

Joe Wiley, Fresno, Calif.

Application August 3, 1936, Serial No. 94,077

5 Claims. (Cl. 17—32)

The invention relates to a food molding machine and more especially to ground or chopped food molding machines.

The primary object of the invention is the provision of a machine of this character, wherein the same involves refinements over the subject matter of an application for patent filed on the twenty-third day of October, 1935, bearing Serial Number 46,453, now Patent No. 2,076,488, issued April 6, 1937; and such refinements lie in the separators and partitions so that the matter molded will have certain configuration or design.

Another object of the invention is the provision of a machine of this character, wherein the molded material can be confined within paper applied in sheet form, the paper being held within the machine for this purpose.

A further object of the invention is the provision of a machine of this character, wherein the material molded can be cut from the mass of material as held within the machine, thereby giving smoothness to the molded substance.

A still further object of the invention is the provision of a machine of this character, which is simple in its construction, possessing refinements over the subject matter of the above mentioned application for patent, thoroughly reliable and efficient in its operation, sanitary, enabling the molding of food stuffs in different designs, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 3 is a sectional view on the line 3—3 of Figure 1.

Figure 4 is a sectional view on the line 4—4 of Figure 2.

Figure 5 is a view similar to Figure 4 showing a slight modification.

Figure 6 is a plan view of one of the mold pieces removed from the machine.

Figure 7 is a view similar to Figure 6 showing a modification.

Figure 8 is a perspective view of a separator as employed with the mold pieces showing a paper covering for the molded substance.

Figure 9 is a front elevation of a grating for use in the machine.

Figure 10 is an edge view thereof.

Figure 11 is a view similar to Figure 3 showing another modification.

Figure 12 is a plan view thereof.

Figure 13 is a perspective view of a mold piece, its component parts being in open position.

Figure 14 is a perspective view of a further modified mold piece.

Figure 15 is a perspective view of a still further modified form of mold piece.

Figure 16 is a side elevation of still another modified form of mold piece.

Similar reference characters indicate corresponding parts throughout the several views in the drawings.

Figure 1:
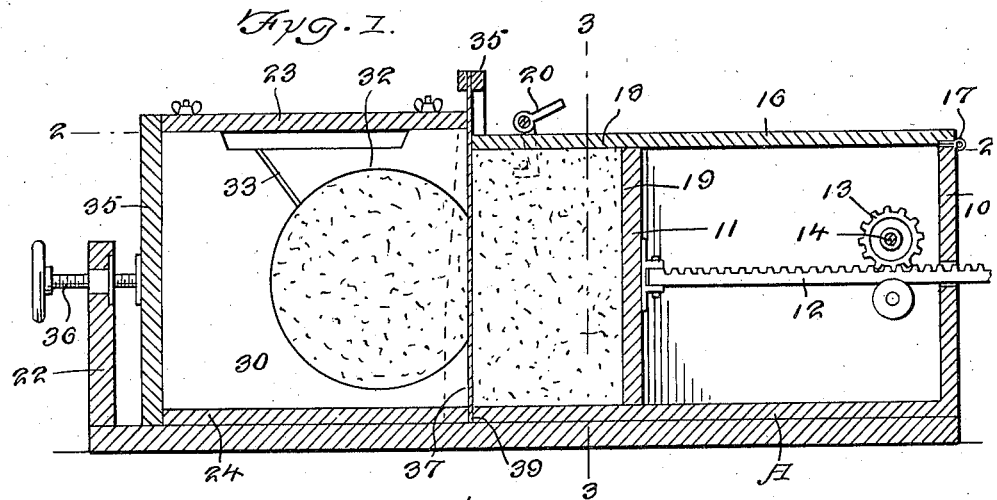
Figure 1 is a vertical longitudinal sectional view through the machine constructed in accordance with the invention.
Figure 2:
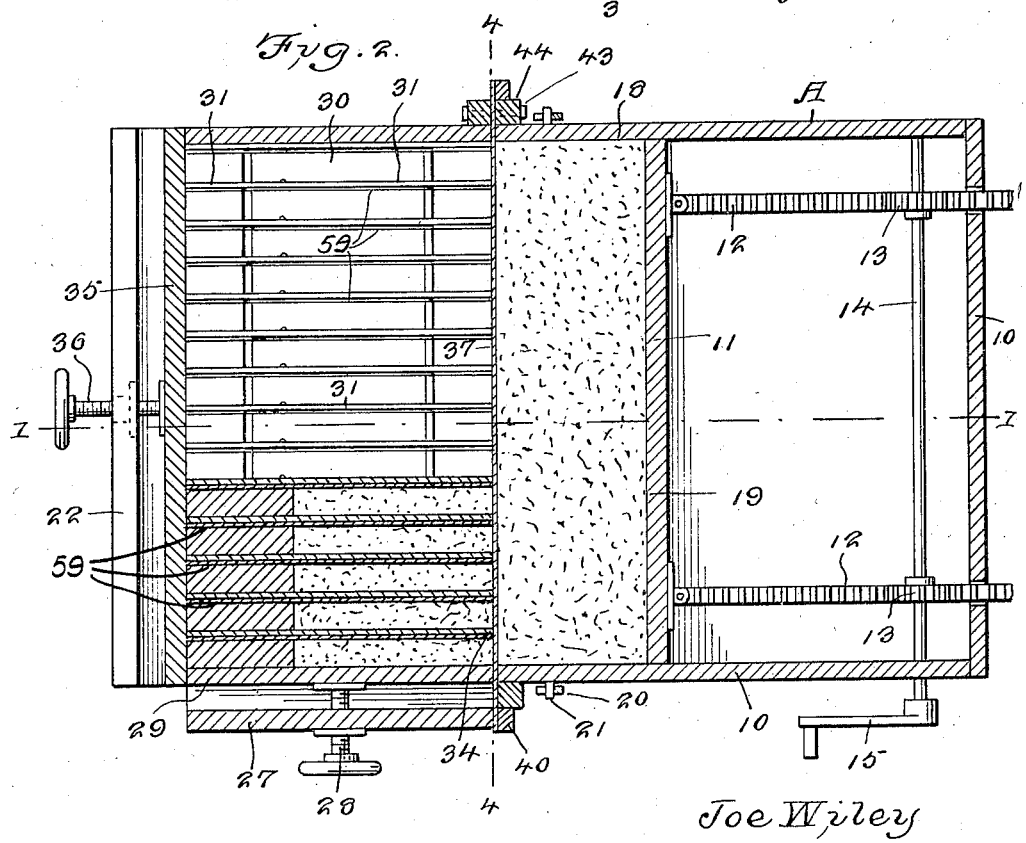
Figure 2 is a sectional view on the line 2—2 of Figure 1.

Referring to the drawings in detail, particularly Figures 1 to 4 inclusive, the machine comprises a body, a portion thereof being indicated at A, forming a housing 10 in which is slidably fitted a presser head 11 connected with rack feeding bars 12 meshing with driving pinions or gears 13 fixed to a rotatable shaft 14 suitably journaled transversely of the housing 10, one end of the shaft being extended outside of said housing and having joined therewith a hand crank 15 for manual operation. At the top of the housing is arranged a gate or door 16, it being hinged at 17 and upon being opened gives access to a feeding space or chamber 18 confronted by said head 11 having the flat working side 19. Into the space or chamber 18 is adapted to be introduced the ground or chopped substance to be molded. The gate 16 in the form of a door is held closed by side latches 20, these manually released from keepers 21 built exteriorly on the housing 10.

Joined with the housing 10 is a bottom and back walled frame or rack 22 which is open at opposite ends and at its top to accommodate a removable mold carrying magazine including half body sections 23 and 24, respectively, separably joined at 25 and 26 to each other. The end piece 27 of the section 23 has fitted therein a follower screw 28 for a follower piece 29. Into this magazine are introduced mold parts 30 and separators 31, respectively, these being alternately arranged side by side when within the magazine. Each mold part 30 has a cavity 32 from which leads an air bleed vent 33, the cavity 32 being presented with an open side facing the chamber or space 18 when within the magazine. The separators at their edges 34 present knife edges to the space or chamber 18, the magazine on the side next to said space or chamber being open so that the substance within such space or chamber when subjected to pressure from the head 11 will be forced into each cavity 32 in the mold part 30 and at the same time a cutting action is set up by the separators 31 whereby the substance will be cut into slabs corresponding to the thickness of the mold parts 30 while the cavities shape the substance when molded by the mold part, the air within the cavity 32 being driven therefrom through the vent 33 so that a complete filling of the cavity can be had on the flow of the material from the space or chamber 18 under pressure from the head 11 operating therein.

The magazine is held within the rack 22 by a clamping plate 35 acted upon by a set screw 36 mounted in the back wall of said rack 22 so that the open side of such magazine will be properly positioned to the feeding space or chamber 18 and also for a purpose presently described.

Operating in a knife gap between the housing 10 and the magazine is a vertically swinging knife blade 37, preferably flared at the top and opposite ends by a framing 38 while the cutting edge 39 is fully exposed, the framing at the end 40 coacts with an abutment 41 to limit the cutting stroke of the side blade 37 and such framing is extended at the top to provide a handle 42. This blade 37 cuts the material from the molded quantity within the cavity 32 of each mold part 30 from the material remaining in the space or chamber 18 in the housing 11. The blade is pivoted for vertical swinging movement at 43, the pivot being fitted in vertical bearings 44 built with the housing 10.

In Figure 5 of the drawings there is shown a slight modification wherein the magazine includes the half body parts 45 and 46, respectively, these separably united at 47 and 48 with each other, the part 45 being equipped with a follower screw 49 for a follower plate 50 interiorly of said magazine; while stacked beneath the latter are the mold parts 51 and separators 52, these being horizontally disposed. Each mold part 51 has a series of molding cavities 53 therein from which lead air venting passages 54 and such cavities have the open sides 55 through which flows the material to be molded within said cavities.

In Figure 7 of the drawings there is shown a modified form of mold part 56 having the pockets or recesses 57 with straight walled sides and back, the air venting passages being indicated at 58.

It is preferable with the use of the separators 52 that each carry a sheet covering or wrapper of paper 59 for the molded material within the cavities in the mold parts, this wrapper or covering being shown in Figure 8 of the drawings as applied to a separator 52.

In Figures 9 and 10 of the drawings there is shown a reticulated grating 60 which is adapted to be interposed between the magazine at the flow side thereof and the space or chamber 18 in the housing 10 so that the material to be molded will be squeezed through such grating for dividing or separating the material as may be delivered into the magazine. In the use of this grating the mold parts are deleted or omitted from the magazine.

In Figures 11 and 12 of the drawings there is shown a modified form of cutter or knife involving a vertically swinging bail 61 having the wire cutting strands 62 built therein and such cutting strands will sever material delivered into the magazine, the bail 61 being adapted to straddle the magazine and the strands 62 operate through suitable clearances as may be provided therein.

In Figure 13 of the drawings there is shown a modified form of mold part involving a pair of matched sections 63 hinged at 64 for the opening and closing of such mold parts. In the inner faces of these sections 63 are molding cavities 65 which match each other when the mold part is closed and such cavities are of a determined configuration for giving shape to the molded material as may be delivered into the cavities. The mold part involving the section 63 is in substitute for the molding parts 30 and 51, respectively.

In Figure 14 of the drawings there is shown a further modification of mold part which involves a block formed in two sections 66, these hinged together at 67 and the inner faces of these sections 66 are formed with matched molding cavities 68, the sections being also provided with clips 69 for sheet paper coverings or wrappings.

In Figure 15 of the drawings there is shown a still further modification of mold part and this part 70 has in its cavity 71 a center core 72 of a determined configuration and supported from a hanger 73 which centers the said core in the cavity.

In Figure 16 of the drawings there is shown a still further modification of mold part and such part 74 has the wall of its cavity 75 corrugated or fluted at 76 for design formation.

The constructions of the machine hereinbefore set forth constitute refinements over the subject matter of the above-mentioned application, a detailed description of the operation of the machine being deemed unnecessary, since the operation is identical to that of the subject matter of the aforesaid application.

What is claimed is:

1. A machine of the character described comprising a housing having a feeding chamber, a head slidable in the housing and working through said chamber, rack bars connected with said head, hand driven rack pinions meshing with said rack bars for operating the same, a magazine rack next to the chamber, a magazine carried by said rack, and alternately arranged mold parts and separators removably fitted in the magazine, the mold parts having molding cavities provided with air vents and communicative with the feed chamber.

2. A machine of the character described comprising a housing having a feeding chamber, a head slidable in the housing and working through said chamber, rack bars connected with said head, hand driven rack pinions meshing with said rack bars for operating the same, a magazine rack next to the chamber, a magazine carried by said rack, alternately arranged mold parts and separators removably fitted in the magazine, the mold parts having molding cavities provided with air vents and communicative with the feed chamber and knife edges formed on said separators next to the feed chamber.

3. A machine of the character described comprising a housing having a feeding chamber, a head slidable in the housing and working through said chamber, rack bars connected with said head, hand driven rack pinions meshing with said rack bars for operating the same, a magazine rack next to the chamber, a magazine carried by said rack, alternately arranged mold parts and separators removably fitted in the magazine, the mold parts having molding cavities provided with air vents and communicative with the feed chamber, knife edges formed on said separators next to the feed chamber, and a cutter swingingly associated with the magazine for the cutting of molded material.

4. A machine of the character described comprising a housing having a feeding chamber, a head slidable in the housing and working through said chamber, rack bars connected with said head, hand driven rack pinions meshing with said rack bars for operating the same, a magazine rack next to the chamber, a magazine carried by said rack, alternately arranged mold parts and separators removably fitted in the magazine, the mold parts having molding cavities provided with air vents and communicative with the feed chamber, knife edges formed on said separators next to the feed chamber, a cutter swingingly associated with the magazine for the cutting of molded material, and separable sections interfitting with each other and forming the magazine.

5. A machine of the character described comprising a housing having a feeding chamber, a head slidable in the housing and working through said chamber, rack bars connected with said head, hand driven rack pinions meshing with said rack bars for operating the same, a magazine rack next to the chamber, a magazine carried by said rack, alternately arranged mold parts and separators removably fitted in the magazine, the mold parts having molding cavities provided with air vents and communicative with the feed chamber, knife edges formed on said separators next to the feed chamber, a cutter swingingly associated with the magazine for the cutting of molded material, separable sections interfitting with each other and forming the magazine, and means arranged with the magazine for holding the mold parts and separators clamped therein.

JOE WILEY.